Jan. 25, 1966 YOZO SASAKI ET AL 3,231,707

METHOD OF MANUFACTURING A THERMOELEMENT

Filed Feb. 11, 1963

INVENTORS
YOZO SASAKI
SHIZUO ASANABE
BY MASAOKI ISHIKAWA

OSTROLENK, FABER, GERB & SOFFEN

ATTORNEYS 3,231,707

METHOD OF MANUFACTURING A THERMOELEMENT

Yozo Sasaki, Shizuo Asanabe, and Masaoki Ishikawa, Tokyo, Japan, assignors to Nippon Electric Company Limited, Tokyo, Japan, a corporation of Japan Filed Feb. 11, 1963, Ser. No. 257,529
Claims priority, application Japan, Feb. 10, 1962, 37/5,078
5 Claims. (Cl. 219—9.5)

Figure 1:
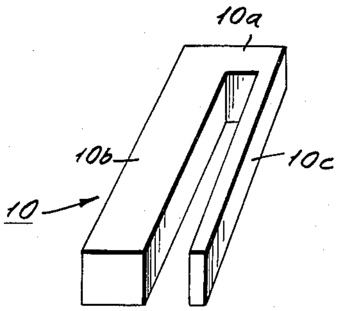

This invention relates to a novel method for manufacturing elements of the thermoelement type which exhibit superior mechanical and electric characteristics.

Thermoelements presently in use are normally comprised of an n-type and a p-type element which are joined together to form an interface. Conventional joining methods employed in the construction of thermoelements may be classified into soldering methods, brazing methods and mechanical pressure contact methods which employ the aid of a spring action.

The principle of operation of thermoelectric generators is such that a temperature gradient is established across the n-type and p-type branches. It is therefore desirable that the temperature of the high-temperature junction constituting a thermoelement be maintained at as high a level as possible in order to derive a large thermal to electrical efficiency. Such high temperature gradients in conventionally manufactured devices are subjected to mechanical injury due to the thermal stress imposed upon the device and further, suffer an increase in contact resistance due to oxidation whereby both the thermal stress and the oxidation are produced when the thermoelements are maintained with high temperature gradients for long periods of time. It is therefore difficult to provide a long useful life thermoelement when it is manufactured in accordance with the above recited methods. Thus in spite of vigorous research activities which have developed materials suitable for use as thermoelements there are very few examples of successful long term operation of thermoelectric generators comprising a combination of suitable thermoelements.

The instant invention provides a novel method which eliminates the defects which accompany a high-temperature junction, thereby insuring the construction of practical thermoelectric generators which exhibit characteristics superior to those of the prior art.

The method of the instant invention is comprised of the steps of providing n-type and p-type branches in predetermined geometric configurations. An intermediate element having a predetermined configuration is provided, which element is positioned between the thermoelement branches so as to form joint interfaces therebetween. These three substances which have been so positioned are then placed in an environment which welds the branches together by means of high frequency induction heating to provide a firm bond between the branches. The heating operation is performed in an atmosphere of an inert gas to eliminate oxidation of the branches. Since the contact resistances of the interfaces between the first branch and the intermediate substance and between the second branch and the intermediate substance are relatively high, these interfaces are heated to a higher temperature than those of both branches and the intermediate substance themselves so as to perform the welding operation before the first and second branches and the intermediate substance reach their melting points, thus preventing alteration or collapse of the configurations of the three substances comprising the thermoelement. The fusion between the branches has been found to be sufficient to provide an extremely rigid bond between the branches and further to minimize contact resistance thus providing a superior thermoelement having an extremely long, useful operating life.

It is therefore the object of the instant invention to provide a novel method for the manufacture of thermoelements having superior characteristics and long operating life.

This is attained by the method which is comprised of welding, by induction heating, two branches to an intermediate substance.

The statement described above will become apparent when reading the accompanying description and drawings in which:

FIGURE 1 is a perspective view of a thermoelement manufactured in accordance with the principles of the instant invention.

Figure 2A:
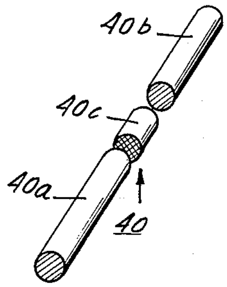
Figure 2B:
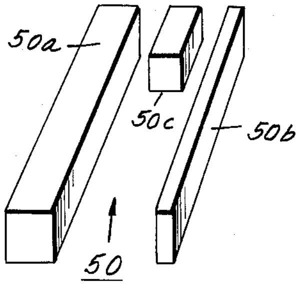
Figure 2C:
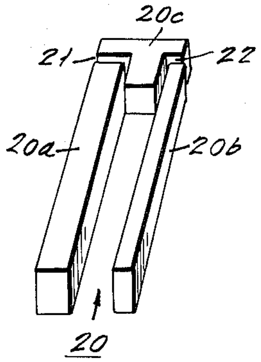

FIGURES 2*a*–2*c* are perspective views showing three alternative embodiments of a thermoelement in the first step of manufacturing.

Figure 3:
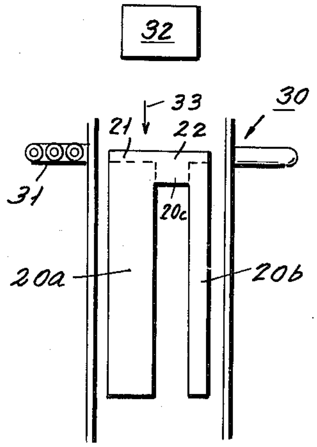

FIGURE 3 is a diagrammatic representation showing the welding apparatus employed for manufacturing thermoelements in accordance with the principles of the instant invention.

Referring now to the drawings, FIG. 1 shows a perspective view of a thermoelement 10 of substantially U-shaped configuration having a yoke portion 10*a*, a p-type arm 10*b* and n-type arm 10*c*. In order to manufacture such a thermoelement the first step is to provide a first arm 20*a*, as shown in FIGURE 2*c*, having the configuration shown therein and whose composition is p-type, for example, manganese silicide ($MnSi_2$). A second arm having the configuration of the arm 20*b*, shown in FIGURE 2*c*, is then provided, which arm has the composition of n-type, for example, cobalt silicide (CoSi). Both of these arms may be produced either by sintering or by casting. The intermediate substance 20*c* has a configuration as shown in FIGURE 2*c*, so as to form the jointed interfaces 21 and 22. A material suitable for the intermediate in this example is CoSi, $MnSi_2$, or their alloy, and the intermediate substance may also be formed into such a shape either by sintering or by cutting the cast material. After the branches 20*a*–20*c* are formed and positioned, as shown in FIGURE 2*c*, they are then placed in the apparatus 30, shown in FIGURE 3, which apparatus is provided with a high frequency induction heating apparatus 31 whereby the joints 21 and 22 are positioned so as to be directly in the region of the induction heating apparatus 31. An inert gas source 32 is provided which is employed so as to provide an inert gas for the operation such that the inert gas flow is in the direction shown by arrow 33. The resistances at the joints 21 and 22 are relatively high, causing these joints to be heated to a higher temperature than those of branches 20*a*–20*c* so that these branches become fused along the interfaces 21 and 22 before the branches themselves reach their melting points. It has been found that if ordinary heating means such as an electric resistance furnace are employed the temperature of each of the branches 20*a*–20*c* all reach their melting point simultaneously with the heating of the interfaces 21 and 22 so that the shapes of the branches 20*a*–20*c* become severly altered and frequently collapse thereby destroying the value and usefulness of the thermoelement.

The above method may be readily employed for producing thermoelement having compositions which differ from those recited above. For example, in the above mentioned embodiments of FIGURES 3 and 2*c*, the branches 20*a* and 20*b* may be any one of the following compositions:

Manganese silicide ($MnSi_2$)—cobalt silicide (CoSi); an alloy of p-type silicon and chromium—an alloy of n-type silicon and chromium; an alloy of p-type silicon and chromium-cobalt silicide; an an alloy of n-type silicon and chromium-manganese silicide, cobalt silicide-cobalt disilicide, to mention just a few. These p- and n-type branches may be produced either by the sintering, casting, or pulling method.

Various other configurations may be employed for producing the thermoelement. For example, FIGURE 2*a* shows a thermoelement 40 having a p-type arm 40*a*, an n-type arm 40*b* and an intermediate substance 40*c*. FIGURE 2*b* shows thermoelement 50 having arms 50*a* and 50*b* and intermediate substance 50*c* wherein 50*c* differs from substance 20*c* of FIGURE 2*c* in that it is substantially cube-shaped while substance 20*c* is substantially T-shaped.

The intermediate substance, such as 20*c*, 40*c* and 50*c* may be formed of any one of the following materials:

Sintered cobalt silicide (CoSi), cast manganese silicide ($MnSi_2$ or MnSi), or an alloy of cobalt silicide (CoSi) and manganese silicide ($MnSi_2$) to mention just a few.

It can therefore be seen that the method of the instant invention produces a thermoelement which has superior mechanical strength and substantially low contact resistance thereby providing a thermoelement which has a long useful operating life.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A method for producing a thermoelement comprising the steps of providing a first branch formed of a p-type composition; providing a second branch formed of an n-type composition; interposing an intermediate substance formed of an n-type composition between said first and second branches; locally heating said first and second branches and said intermediate substance at the interfaces of said branches by high frequency induction heating to weld said intermediate substance to said first and second branches.

2. A method for producing a thermoelement comprising the steps of providing a first branch formed of a p-type composition; providing a second branch formed of an n-type composition; interposing an intermediate substance formed of a p-type composition between said first and second branches; locally heating said first and second branches and said intermediate substance at the interfaces of said branches by high frequency induction heating to weld said intermediate substance to said first and second branches.

3. A method for producing a thermoelement comprising the steps of providing a first branch formed of a p-type composition; providing a second branch formed of an n-type composition; interposing an intermediate substance formed of an alloy of a p-type and an n-type composition between said first and second branches; locally heating said first and second branches and said intermediate substance at the interfaces of said branches by high frequency induction heating to weld said intermediate substance to said first and second branches.

4. A method of producing a thermoelement comprising the steps of providing a first branch formed of a p-type composition; providing a second branch formed of an n-type composition; interposing an intermediate substance comprised of a material selected from the group of manganese silicide; cobalt silicide, an alloy of manganese silicide and cobalt silicide, between said first and second branches; locally heating said first and second branches and said intermediate substance at the interfaces of said branches by high frequency induction heating to weld said intermediate substance to said first and second branches.

5. The method of claim 1 further comprising the step of maintaining the temperature during the heating of the two branches and the substance at a level sufficient to weld the two branches to the substance and insufficient to melt the substance and the first and second branches.

References Cited by the Examiner

UNITED STATES PATENTS

| | | | |
|---|---|---|---|
| 2,497,665 | 2/1950 | Gravley | 29—25.35 |
| 2,966,571 | 12/1960 | Markert | 219—9.5 |

RICHARD M. WOOD, *Primary Examiner.*